United States Patent
Bai et al.

(10) Patent No.: US 12,538,136 B2
(45) Date of Patent: Jan. 27, 2026

(54) ANTENNA PATTERN SELECTION METHOD AND APPARATUS

(71) Applicant: Huawei Technologies Co., Ltd., Shenzhen (CN)

(72) Inventors: Xiaofei Bai, Suzhou (CN); Bing Feng, Shanghai (CN); Yang Ji, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 493 days.

(21) Appl. No.: 17/727,098

(22) Filed: Apr. 22, 2022

(65) Prior Publication Data
US 2022/0345905 A1     Oct. 27, 2022

(30) Foreign Application Priority Data

Apr. 25, 2021 (CN) .......................... 202110447785.7

(51) Int. Cl.
| | | |
|---|---|---|
| *H04L 1/20* | (2006.01) | |
| *H04B 1/401* | (2015.01) | |
| *H04B 7/06* | (2006.01) | |
| *H04B 7/08* | (2006.01) | |
| *H04L 5/00* | (2006.01) | |
| *H04W 16/28* | (2009.01) | |

(52) U.S. Cl.
CPC .......... *H04W 16/28* (2013.01); *H04B 7/0617* (2013.01); *H04B 7/088* (2013.01); *H04L 5/0053* (2013.01)

(58) Field of Classification Search
CPC ..... H04W 16/28; H04B 7/0617; H04B 7/088; H04B 17/318
See application file for complete search history.

(56) References Cited

U.S. PATENT DOCUMENTS

| | | | |
|---|---|---|---|
| 9,318,805 B2 | 4/2016 | Jia | |
| 10,856,280 B2 * | 12/2020 | Noh | ...................... H04W 72/23 |
| 2005/0063343 A1 | 3/2005 | Hoffmann et al. | |

(Continued)

FOREIGN PATENT DOCUMENTS

CN          104584325 A       4/2015

OTHER PUBLICATIONS

3GPP TSG RAN WG1 Meeting#99, R1-1913525 Title: Summary#3 for AI 7.2.4.2.2 Mode-2 Resource Allocation (Year: 2019).*

(Continued)

*Primary Examiner* — Faruk Hamza
*Assistant Examiner* — Abusayeed M Haque
(74) *Attorney, Agent, or Firm* — Conley Rose, P.C.

(57) ABSTRACT

An antenna pattern selection method includes a first communication device sending a plurality of packets to a second communication device. Then, the first communication device measures, in each of a plurality of antenna patterns, signal quality of a plurality of acknowledgment frames with which the second communication device separately responds to the plurality of packets, and finally selects a dominant antenna pattern from the plurality of antenna patterns based on signal quality corresponding to each of the plurality of antenna patterns. According to the antenna pattern selection method, when normal communication is not affected, the first communication device may determine, based on signal quality of an acknowledgment frame, whether an antenna pattern used by the first communication device is proper.

20 Claims, 4 Drawing Sheets

(56) References Cited

U.S. PATENT DOCUMENTS

| | | | |
|---|---|---|---|
| 2011/0263218 A1* | 10/2011 | Ishii | H04B 7/0877 |
| | | | 455/138 |
| 2013/0272274 A1* | 10/2013 | Ishida | H04W 72/27 |
| | | | 370/336 |
| 2015/0085840 A1* | 3/2015 | Liu | H04L 5/0055 |
| | | | 370/336 |
| 2016/0112181 A1* | 4/2016 | Tabet | H04W 72/21 |
| | | | 370/296 |
| 2016/0269132 A1* | 9/2016 | Clark | H04B 17/318 |
| 2019/0199423 A1 | 6/2019 | Khoury | |
| 2021/0051495 A1* | 2/2021 | Gupta | H04W 24/04 |

OTHER PUBLICATIONS

3GPP TSG-RAN WG2#99, R2-1707694 Title:Cell quality in the measurment rreport (Year: 2017).*

* cited by examiner

ANTENNA PATTERN SELECTION METHOD AND APPARATUS

CROSS-REFERENCE TO RELATED APPLICATION

This claims priority to Chinese Patent Application No. 202110447785.7 filed on Apr. 25, 2021, which is hereby incorporated by reference in its entirety.

TECHNICAL FIELD

This disclosure relates to the field of communication technologies, and in particular, to an antenna pattern selection method and apparatus.

BACKGROUND

There is a problem in a smart antenna-based communication system: when a network device sends data to a terminal device, how a selection algorithm of a smart antenna selects an optimal antenna pattern from an omnidirectional antenna pattern and a directional antenna pattern that are included in the smart antenna, so that the network device and the terminal device implement optimal signal transmission.

A selection algorithm of the smart antenna is as follows: a data packet is sent by using at least one higher-order modulation and coding scheme (MCS) for each of the omnidirectional antenna pattern and the directional antenna pattern that are included in the smart antenna. A packet error rate that is of the terminal device and that corresponds to each antenna pattern in the at least one MCS is calculated. An antenna pattern corresponding to a smallest packet error rate is used as the optimal antenna pattern. In addition, after the optimal antenna pattern is selected for the terminal device, in the selection algorithm of the smart antenna, an antenna pattern is reselected if traffic of the terminal device constantly decreases.

However, the foregoing selection algorithm of the smart antenna causes a large number of packet losses to the terminal device, causing a service delay and stalling of the terminal device.

SUMMARY

This disclosure provides an antenna pattern selection method and apparatus, to avoid a large number of packet losses of a terminal device and further improve accuracy of a selected optimal antenna pattern.

According to a first aspect, this disclosure provides an antenna pattern selection method, applied to a first communication device. The first communication device communicates with another communication device by using a plurality of antenna patterns, the plurality of antenna patterns include an omnidirectional antenna pattern and a plurality of directional antenna patterns, and the method includes: sending a plurality of packets to a second communication device; measuring, in each of the plurality of antenna patterns, signal quality of a plurality of acknowledgment frames with which the second communication device separately responds to the plurality of packets; and selecting a dominant antenna pattern from the plurality of antenna patterns based on signal quality corresponding to each of the plurality of antenna patterns.

According to the antenna pattern selection method, a dominant antenna pattern is determined based on signal quality of an acknowledgment frame corresponding to each antenna pattern. A lower-order MCS makes it easier for a communication device to correctly decode a packet sent by using the MCS. Because an acknowledgment frame is usually sent by using a lower-order MCS, if the second communication device successfully receives a packet sent by the first communication device, the first communication device usually can receive an acknowledgment frame of the packet even if signal quality of receiving the acknowledgment frame by the first communication device decreases because of a used antenna pattern. Therefore, without affecting normal communication, the first communication device may determine, based on signal quality of an acknowledgment frame, whether an antenna pattern used by the first communication device is proper, so that impact on communication between the first communication device and the second communication device during an antenna pattern test can be reduced.

With reference to the first aspect, in a possible implementation, the sending a plurality of packets to a second communication device includes: sending the plurality of packets to the second communication device in the omnidirectional antenna pattern.

With reference to the first aspect, in a possible implementation, the plurality of packets includes a plurality of data frames.

With reference to the first aspect, in a possible implementation, when there is one dominant antenna pattern, the method further includes: communicating with the second communication device by using the dominant antenna pattern as an optimal antenna pattern.

With reference to the first aspect, in a possible implementation, when a number of dominant antenna patterns is greater than 1, the method further includes: performing antenna training on the dominant antenna pattern to obtain an optimal antenna pattern; and communicating with the second communication device by using the optimal antenna pattern.

According to the antenna pattern selection method provided in this embodiment of this disclosure, because only a dominant antenna pattern is trained during antenna training, a packet loss of the second communication device in the antenna training process can be avoided. In addition, because the dominant antenna pattern is selected based on signal quality, a training amount of an algorithm of an antenna is reduced, so that the training process is accelerated.

With reference to the first aspect, in a possible implementation, the performing antenna training on the dominant antenna patterns to obtain an optimal antenna pattern includes: obtaining a physical throughput corresponding to each of the dominant antenna patterns; and selecting the optimal antenna pattern from the dominant antenna patterns based on the physical throughput. A first physical throughput corresponding to the optimal antenna pattern is a largest physical throughput in all physical throughputs corresponding to the dominant antenna patterns, and a difference between the first physical throughput and a physical throughput that ranks second when all the physical throughputs are sorted in descending order is greater than or equal to a throughput threshold.

According to the antenna pattern selection method provided in this embodiment of this disclosure, after dominant antenna patterns are determined, a physical throughput corresponding to each of the dominant antenna patterns is obtained to select an optimal antenna pattern. In the technical solution, when the optimal antenna pattern is selected by using a physical throughput, the physical throughput needs to be the largest, and a difference between the physical throughput and a physical throughput that ranks second when all physical throughputs are sorted in descending order further needs to be greater than or equal to a throughput threshold, so that accuracy of the optimal antenna pattern selected by using the physical throughput can be ensured.

With reference to the first aspect, in a possible implementation, the throughput threshold is one tenth of the physical throughput that ranks second.

With reference to the first aspect, in a possible implementation, the method further includes: obtaining signal quality corresponding to each of the dominant antenna patterns; and the selecting the optimal antenna pattern from the dominant antenna patterns based on the physical throughput includes: selecting the optimal antenna pattern from the dominant antenna patterns based on the physical throughput and the signal quality. Signal quality corresponding to the optimal antenna pattern is highest signal quality in all signal quality corresponding to the dominant antenna patterns.

According to the antenna pattern selection method provided in this embodiment of this disclosure, after dominant antenna patterns are determined, to select an optimal antenna pattern from the dominant antenna patterns, not only a physical throughput corresponding to each antenna pattern is used as an evaluation metric, but also signal quality corresponding to each antenna pattern is used to jointly select the optimal antenna pattern. The method can improve accuracy of selecting the optimal antenna pattern. For example, transient movement of the second communication device may cause a relatively large throughput change. If only the physical throughput is used for evaluation, the optimal antenna pattern may change in this case. If two evaluation metrics are used for selection, the optimal antenna pattern is more reliable.

With reference to the first aspect, in a possible implementation, the method further includes: triggering antenna retraining if signal quality of communication with the second communication device constantly decreases for t consecutive periods and/or a physical throughput of communication with the second communication device constantly decreases for s consecutive periods when the first communication device communicates with the second communication device in the optimal antenna pattern, where t and s are positive integers greater than or equal to 2.

In the technical solution, in comparison with the conventional technology, when it is determined whether to trigger antenna retraining, signal quality is introduced in addition to a physical throughput. Therefore, it may be determined, from a plurality of dimensions, whether to trigger smart antenna retraining, so that accuracy of triggering antenna retraining is improved.

According to a second aspect, this disclosure provides an antenna pattern selection apparatus, applied to a first communication device. The first communication device communicates with another communication device by using a plurality of antenna patterns, the plurality of antenna patterns include an omnidirectional antenna pattern and a plurality of directional antenna patterns, and the apparatus includes: a sending module, configured to send a plurality of packets to a second communication device; a measurement module, configured to measure, in each of the plurality of antenna patterns, signal quality of a plurality of acknowledgment frames with which the second communication device separately responds to the plurality of packets; and a selection module, configured to select a dominant antenna pattern from the plurality of antenna patterns based on signal quality corresponding to each of the plurality of antenna patterns.

With reference to the second aspect, in a possible implementation, the sending module is configured to send the plurality of packets to the second communication device in the omnidirectional antenna pattern.

With reference to the second aspect, in a possible implementation, the plurality of packets includes a plurality of data frames.

With reference to the second aspect, in a possible implementation, when there is one dominant antenna pattern, the apparatus further includes a communication module, configured to communicate with the second communication device by using the dominant antenna pattern as an optimal antenna pattern.

With reference to the second aspect, in a possible implementation, when a number of dominant antenna patterns is greater than 1, the apparatus further includes a training module, configured to perform antenna training on the dominant antenna patterns to obtain an optimal antenna pattern. The communication module is further configured to communicate with the second communication device by using the optimal antenna pattern.

With reference to the second aspect, in a possible implementation, the training module is configured to: obtain a physical throughput corresponding to each of the dominant antenna patterns; and select the optimal antenna pattern from the dominant antenna patterns based on the physical throughput. A first physical throughput corresponding to the optimal antenna pattern is a largest physical throughput in all physical throughputs corresponding to the dominant antenna patterns, and a difference between the first physical throughput and a physical throughput that ranks second when all the physical throughputs are sorted in descending order is greater than or equal to a throughput threshold.

With reference to the second aspect, in a possible implementation, the throughput threshold is one tenth of the physical throughput that ranks second.

With reference to the second aspect, in a possible implementation, the apparatus further includes an obtaining module, configured to obtain signal quality corresponding to each of the dominant antenna patterns. The selection module is further configured to select the optimal antenna pattern from the dominant antenna patterns based on the physical throughput and the signal quality. Signal quality corresponding to the optimal antenna pattern is highest signal quality in all signal quality corresponding to the dominant antenna patterns.

With reference to the second aspect, in a possible implementation, the apparatus further includes a triggering module, configured to trigger antenna retraining if signal quality of communication with the second communication device constantly decreases for t consecutive periods and/or a physical throughput of communication with the second communication device constantly decreases for s consecutive periods when the apparatus communicates with the second communication device in the optimal antenna pattern, where t and s are positive integers greater than or equal to 2.

According to a third aspect, this disclosure provides an antenna pattern selection apparatus, including a memory and a processor. The memory is configured to store program instructions; and the processor is configured to invoke the program instructions in the memory to perform the antenna pattern selection method according to any one of the first aspect and the possible implementations of the first aspect.

In some implementations, the apparatus may be a chip. In these implementations, optionally, the apparatus may further include a communication interface, configured to communicate with another apparatus or device.

According to a fourth aspect, this disclosure provides a computer-readable medium. The computer-readable medium stores program code to be executed by a computer, and the program code includes instructions used to perform the antenna pattern selection method according to any one of the first aspect and the possible implementations of the first aspect.

According to a fifth aspect, this disclosure provides a computer program product. The computer program product includes computer program code, and when the computer program code runs on a computer, the computer performs the antenna pattern selection method according to any one of the first aspect and the possible implementations of the first aspect.

DESCRIPTION OF EMBODIMENTS

A related term in this disclosure is first described for ease of understanding.

1. Modulation and Coding Scheme

The MCS mainly implements a radio frequency rate configuration in a wireless local area network (WLAN). In the WLAN, the radio frequency rate configuration is implemented by using a modulation and coding scheme MCS index value. A modulation and coding table of the MCS is a representation form provided to represent a communication rate of the WLAN. The MCS uses concerned factors affecting the communication rate as a column of the table, and uses the MCS index as a row, to obtain a rate table. Therefore, each MCS index actually corresponds to a physical transmission rate in a group of parameters.

Figure 1:
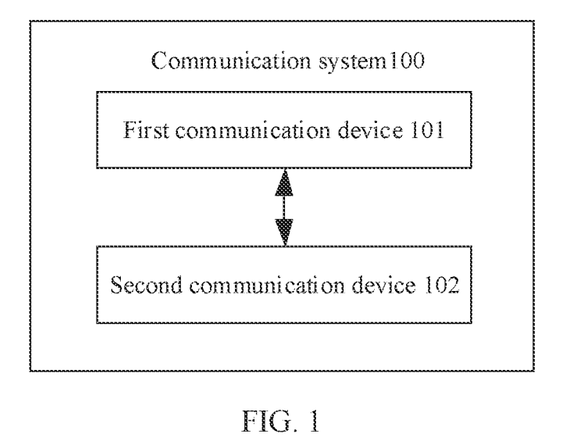
FIG. 1 is a schematic diagram of a communication system according to an embodiment of this disclosure.

FIG. 1 is a schematic diagram of a communication system according to an embodiment of this disclosure. As shown in FIG. 1, the communication system 100 in this disclosure may include a first communication device 101 and a second communication device 102.

The first communication device 101 is a device that connects a terminal (also referred to as a terminal device) to a wireless network, and is also referred to as a wireless access point (AP). In this embodiment of this disclosure, the first communication device may also be referred to as a network device. The second communication device 102 may be a mobile device with a WLAN function. The second communication device may be deployed on land and includes an indoor or outdoor device, a handheld device, or a vehicle-mounted device, or may be deployed on the water (for example, a ship), or may be deployed in the air (for example, an airplane, a balloon, or a satellite). The terminal device may be a mobile phone (mobile phone), a tablet computer (Pad), a computer with a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. This is not limited herein.

For the communication system shown in FIG. 1, when the first communication device 101 sends data to the second communication device 102, the first communication device 101 needs to convert the data into an electromagnetic wave and send the electromagnetic wave to the second communication device 102 by using an antenna. When data is sent by using the antenna, the data may be sent in an omnidirectional antenna pattern, or the data may be sent in a directional antenna pattern.

The omnidirectional antenna pattern and the directional antenna pattern may be considered as different states of a direction of beam energy concentration in which the antenna sends data. The omnidirectional antenna pattern means that beam energy of the antenna covers a direction of 360 degrees when the first communication device sends data by using the antenna. The directional antenna pattern means that beam energy of the antenna is concentrated in a specific direction when the first communication device sends data by using the antenna. It may be understood that there may be a plurality of specific directions, and therefore there may also be a plurality of directional antenna patterns.

It should be understood that a direction of beam energy concentration may be set for an antenna in the first communication device. An antenna pattern may be considered as representing a direction of beam energy concentration in which the first communication device sends data to the second communication device. If directions of beam energy concentration are different, it is considered that antenna patterns are different. For example, if directions of beam energy concentration of the antenna may include 0 degrees to 90 degrees, 90 degrees to 180 degrees, 180 degrees to 270 degrees, 270 degrees to 360 degrees, and 0 degrees to 360 degrees, it indicates that five antenna patterns are available to the antenna. A pattern in which beam energy covers 0 degrees to 360 degrees is the omnidirectional pattern.

It should be noted herein that when the first communication device communicates with the second communication device, a plurality of antennas, for example, two groups of antennas, may be used. For example, if each group of antennas includes one omnidirectional pattern and four directional patterns, there are 25 antenna patterns in theory for two groups of antennas. In actual disclosure, a required antenna pattern may be selected from the 25 antenna patterns based on different use scenarios. This is not limited in embodiments of this disclosure. It should further be noted herein that a case in which there are two groups of antennas and each group of antennas includes four directional antenna patterns is merely an example, and there may be another number. This is not limited in embodiments of this disclosure.

When the omnidirectional antenna pattern is used, a relatively large range may be covered, but a transmission distance is limited. For example, when the second communication device 102 is quite distant from the network device 101 or an obstacle exists, signal energy received by the second communication device 102 is low, and consequently, the second communication device 102 and the first communication device 101 cannot communicate with each other well. When the directional antenna pattern is used, the transmission distance may be increased. However, because a radiation range is limited, good signal transmission cannot be performed if the second communication device 102 falls beyond the radiation range. Therefore, when the first communication device 101 sends data to the second communication device 102, a quite important problem is how to select an optimal antenna pattern from the omnidirectional antenna pattern and the directional antenna pattern for sending the data to the second communication device 102 to implement optimal signal transmission between the first communication device 101 and the second communication device 102.

Currently, in an antenna pattern training algorithm, an optimal antenna pattern may be selected from the omnidirectional antenna pattern and the directional antenna pattern. The method is as follows: for each of the omnidirectional antenna pattern and the directional antenna pattern, a downlink data packet is sent to the second communication device 102 based on at least one higher-order MCS, then a packet error rate of the second communication device 102 in the at least one MCS in each antenna pattern is obtained, and finally, an antenna pattern corresponding to a smallest packet error rate is used as the optimal antenna pattern. Further, after the optimal antenna pattern is determined, if a physical throughput of the second communication device 102 constantly decreases in the antenna pattern, an optimal antenna pattern is reselected in the antenna pattern training algorithm.

However, in the existing antenna pattern training algorithm, when a direction that is covered by beam energy and that corresponds to a used antenna pattern cannot cover the second communication device 102, if a downlink data packet is sent to the second communication device 102 based on a higher-order MCS, a large number of packet losses constantly occur in the second communication device 102, causing phenomena such as a service delay and stalling of the terminal device. In addition, when the optimal antenna pattern is selected in the existing antenna pattern training algorithm, only a packet error rate is used to select the optimal antenna pattern, and determining conditions are not diversified, causing low accuracy of the selected optimal antenna pattern. In addition, when it is determined whether to perform retraining, only the physical throughput of the second communication device 102 is used as a determining basis, and determining conditions are not diversified, causing low retraining accuracy.

In view of this, this disclosure provides an antenna pattern selection method. In technical solutions of this disclosure, a dominant antenna pattern is selected from all antenna patterns based on signal quality that is of an acknowledgment frame returned by a terminal device and that is measured in each antenna pattern. In addition, if a number of selected dominant antenna patterns is greater than 1, the selected dominant antenna patterns are further trained, and signal quality-based multi-dimensional determining is added in the training process, to improve accuracy of a finally selected optimal antenna pattern. Further, in the technical solutions of this disclosure, when it is determined whether to trigger antenna pattern reselection, signal quality-based multi-dimensional determining is also added, to improve accuracy of determining whether to trigger antenna pattern reselection.

Figure 2:
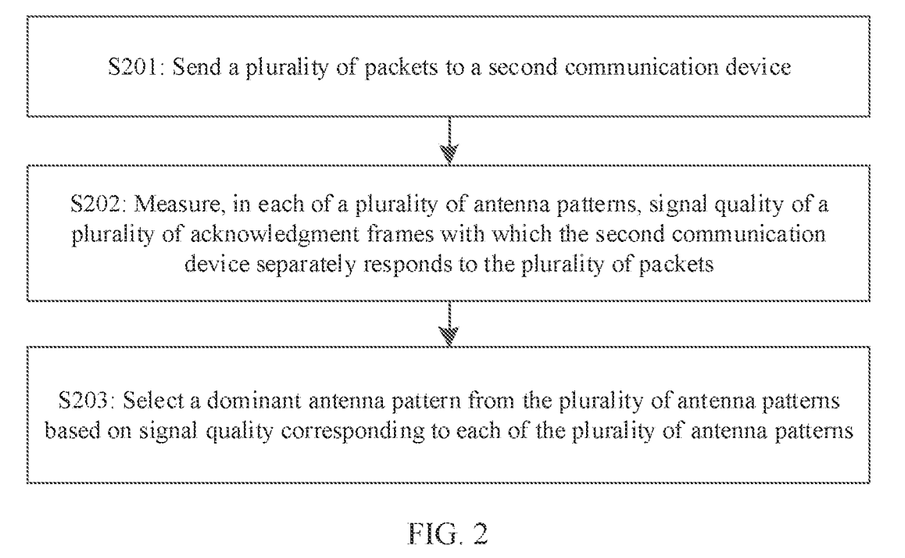
FIG. 2 is a schematic flowchart of an antenna pattern selection method according to an embodiment of this disclosure.

FIG. 2 is a schematic flowchart of an antenna pattern selection method according to an embodiment of this disclosure. As shown in FIG. 2, the method in this embodiment may include S201, S202, and S203.

The antenna pattern selection method may be performed by the first communication device 101 in the communication system shown in FIG. 1. In this embodiment, the first communication device 101 may communicate with another communication device by using a plurality of antenna patterns. The plurality of antenna patterns includes an omnidirectional antenna pattern and a plurality of directional antenna patterns.

S201: Send a plurality of packets to a second communication device.

A packet is a data block in the communication system. For detailed descriptions of the packet, refer to related technical descriptions.

For example, the plurality of packets may be Physical Layer Convergence Procedure Protocol data units (PPDU).

In this embodiment, the first communication device may send the plurality of packets to the second communication device by using the omnidirectional antenna pattern.

It may be understood that if the first communication device uses the omnidirectional antenna pattern when the first communication device sends the plurality of packets to the second communication device, it can be ensured that the second communication device can receive the plurality of packets. Further, when the plurality of packets is sent by using the omnidirectional antenna pattern, a higher-order MCS may further be used.

In this embodiment, the first communication device may alternatively send the plurality of packets to the second communication device by using a trained directional antenna pattern. The trained directional antenna pattern is a directional antenna pattern that can ensure that the second communication device can receive the plurality of packets.

For example, an antenna of the first communication device includes four directional antenna patterns and one omnidirectional antenna pattern. It is assumed that the four directional antenna patterns are referred to as an antenna pattern 1, an antenna pattern 2, an antenna pattern 3, and an antenna pattern 4. Beam energy coverage represented by the antenna pattern 1 is 0 degrees to 90 degrees, beam energy coverage represented by the antenna pattern 2 is 90 degrees to 180 degrees, beam energy coverage represented by the antenna pattern 3 is 180 degrees to 270 degrees, beam energy coverage represented by the antenna pattern 4 is 270 degrees to 360 degrees, and beam energy coverage represented by the omnidirectional antenna pattern is 0 degrees to 360 degrees. In this case, if the second communication device falls within the beam energy coverage included in the antenna pattern 2, the first communication device may alternatively send the plurality of packets to the second communication device by using the antenna pattern 2.

It should be noted herein that a number of the plurality of packets and a format of the plurality of packets are not limited in this embodiment. For example, the plurality of packets may be 100 PPDUs.

S202: Measure, in each of the plurality of antenna patterns, signal quality of a plurality of acknowledgment frames with which the second communication device separately responds to the plurality of packets.

In this embodiment, signal quality of an acknowledgment frame is measured in each of the plurality of antenna patterns. However, because an MCS of the acknowledgment frame has a lower order, even if the first communication device receives the acknowledgment frame by using an antenna pattern that does not match the second communication device, the acknowledgment frame can be correctly decoded, so that communication between the first communication device and the second communication device is not affected. For detailed descriptions of a case in which the lower-order MCS is used for the acknowledgment frame, refer to related technical descriptions. Details are not described herein.

It may be understood that when the first communication device sends a packet to the second communication device, if the second communication device receives the packet, the second communication device needs to return an acknowledgment frame to the first communication device, so that the first communication device learns that the second communication device receives the packet.

In this embodiment, the antenna of the first communication device includes a plurality of antenna patterns. At least one acknowledgment frame needs to be received for each antenna pattern. Therefore, when the first communication device sends the plurality of packets in this embodiment, the number of the plurality of sent packets needs to be at least equal to a number of to-be-tested antenna patterns. Only in this way, at least one acknowledgment frame can be received for each of the plurality of antenna patterns when the second communication device receives the plurality of packets and sends the plurality of acknowledgment frames in response to the plurality of packets.

In an example in which the antenna of the first communication device includes one omnidirectional antenna pattern and four directional antenna patterns, when the first communication device sends the plurality of packets to the second communication device, the number of the plurality of packets is 5. In this case, when receiving the five packets, the second communication device returns five corresponding acknowledgment frames to the first communication device. In this case, the first communication device may receive one acknowledgment frame in each antenna pattern.

Still in the example in which the antenna of the first communication device includes one omnidirectional antenna pattern and four directional antenna patterns, when the first communication device sends the plurality of packets to the second communication device, the number of the plurality of packets is 500. In this case, when receiving the 500 packets, the second communication device returns 500 corresponding acknowledgment frames to the first communication device. In this case, the first communication device may receive 100 acknowledgment frames in each antenna pattern.

A manner in which the second communication device sends the plurality of acknowledgment frames corresponding to the plurality of packets to the first communication device is not limited in this embodiment.

For example, in an implementation, when sending the acknowledgment frames to the first communication device, the second communication device may send an acknowledgment frame corresponding to a packet to the first communication device once receiving the packet.

For another example, in another implementation, when sending the acknowledgment frames to the first communication device, the second communication device may send some acknowledgment frames corresponding to some packets to the first communication device together once receiving some packets.

In this embodiment, the acknowledgment frame may be, for example, a block acknowledgment (BA) frame.

It may further be understood that each acknowledgment frame received by the first communication device has corresponding signal quality. For example, the signal quality may be a received signal strength indicator (RSSI) or a signal-to-noise ratio (SNR). This is not limited in embodiments of this disclosure. Therefore, for each antenna pattern, after receiving an acknowledgment frame sent by the second communication device, the first communication device may obtain signal quality of the acknowledgment frame included in the antenna pattern.

S203: Select a dominant antenna pattern from the plurality of antenna patterns based on signal quality corresponding to each of the plurality of antenna patterns.

In this embodiment, for each antenna pattern, after signal quality of an included acknowledgment frame is obtained, signal quality corresponding to the antenna pattern may be determined based on the signal quality of the acknowledgment frame.

In an implementation, for each antenna pattern, if one acknowledgment frame is included, signal quality of the acknowledgment frame may be used as signal quality corresponding to the antenna pattern. It should be noted herein that using the signal quality of the acknowledgment frame as the signal quality corresponding to the antenna pattern is merely an example, and another manner may be used. For example, a value obtained after the signal quality of the acknowledgment frame is processed is used as the signal quality corresponding to the antenna pattern. This is not limited in embodiments of this disclosure.

In another implementation, for each antenna pattern, if a plurality of acknowledgment frames is included, after signal quality separately corresponding to the plurality of acknowledgment frames is measured, an average value of the signal quality of the plurality of acknowledgment frames may be used as signal quality corresponding to the antenna pattern.

For example, the first communication device includes one omnidirectional antenna pattern and four directional antenna patterns, and the four directional antenna patterns are referred to as an antenna pattern 1, an antenna pattern 2, an antenna pattern 3, and an antenna pattern 4. Assuming that when sending the plurality of packets to the second communication device, the first communication device sends 100 PPDUs by using the omnidirectional antenna pattern, after receiving the 100 PPDUs, the second communication device separately returns 100 acknowledgment frames to the first communication device in response to the 100 PPDUs. In this case, assuming that a number of acknowledgment frames received in each antenna pattern of the first communication device is 20, 20 acknowledgment frames are received in the omnidirectional antenna pattern, 20 acknowledgment frames are received in the antenna pattern 1, 20 acknowledgment frames are received in the antenna pattern 2, 20 acknowledgment frames are received in the antenna pattern 3, and 20 acknowledgment frames are received in the antenna pattern 4. In this way, for each antenna pattern, an average value of signal quality of the 20 acknowledgment frames may be calculated and used as signal quality corresponding to the antenna pattern.

It should be noted herein that calculating an average value of signal quality of a plurality of acknowledgment frames in each antenna pattern to obtain signal quality corresponding to the antenna pattern is merely an implementation, and another implementation may be used. This is not limited in embodiments of this disclosure.

It may be understood that signal quality corresponding to each antenna pattern can reflect a communication status between the first communication device and the second communication device when the first communication device communicates with the second communication device by using the antenna pattern.

It may further be understood that each directional antenna pattern has a radiation range of a specific direction. If the second communication device falls within the radiation range of the direction, a communication effect between the second communication device and the first communication device is relatively good, and signal quality of an acknowledgment frame that is sent by the second communication device and that is received by the first communication device is relatively high. However, if the second communication device falls beyond the radiation range of the direction, for example, a direction of a location of the second communication device is opposite to a direction of a directional antenna pattern (in this disclosure, the directional antenna pattern in the direction is referred to as a reverse antenna pattern), signal quality of an acknowledgment frame that is sent by the second communication device and that is received by the first communication device is quite low.

Therefore, in this embodiment, the first communication device may select, based on the signal quality corresponding to each antenna pattern, an antenna pattern with high signal quality for communication with the second communication device. In this embodiment, the antenna pattern with high signal quality is also referred to as a dominant antenna pattern.

According to the antenna pattern selection method provided in this embodiment of this disclosure, a dominant antenna pattern is determined based on signal quality of an acknowledgment frame corresponding to each antenna pattern. A lower-order MCS makes it easier for a communication device to correctly decode a packet sent by using the MCS. Because an acknowledgment frame is usually sent by using a lower-order MCS, if the second communication device successfully receives a packet sent by the first communication device, the first communication device usually can receive an acknowledgment frame of the packet even if signal quality of receiving the acknowledgment frame by the first communication device decreases because of a used antenna pattern. Therefore, without affecting normal communication, the first communication device may determine, based on signal quality of an acknowledgment frame, whether an antenna pattern used by the first communication device is proper, so that impact on communication between the first communication device and the second communication device during an antenna pattern test can be reduced.

Optionally, if one dominant antenna pattern is selected, it indicates that the dominant antenna pattern is an optimal antenna pattern, and the first communication device may communicate with the second communication device based on the dominant antenna pattern. For a process in which the first communication device communicates with the second communication device, refer to related technical descriptions. Details are not described herein.

Optionally, the plurality of packets sent by the first communication device to the second communication device include a plurality of data frames. For related descriptions of the data frame, refer to related technical descriptions. Details are not described herein.

In an optional embodiment, when a number of dominant antenna patterns is greater than 1, the method further includes: performing antenna training on the dominant antenna pattern to obtain an optimal antenna pattern; and communicating with the second communication device by using the optimal antenna pattern.

In the method, because only a dominant antenna pattern is trained during antenna training, in other words, a reverse antenna pattern has been screened out, a packet loss of the second communication device can be avoided. In addition, because the dominant antenna pattern is selected based on signal quality, a training amount of an algorithm of a smart antenna is reduced, so that the training process is accelerated, a time in which work of another algorithm is affected is reduced, and overall communication efficiency is improved.

In a possible implementation, the performing antenna training on the dominant antenna pattern to obtain an optimal antenna pattern may include: obtaining a physical throughput corresponding to each of the dominant antenna patterns; and selecting the optimal antenna pattern from the dominant antenna patterns based on the physical throughput. A first physical throughput corresponding to the optimal antenna pattern is a largest physical throughput in all physical throughputs corresponding to the dominant antenna patterns, and a difference between the first physical throughput and a physical throughput that ranks second when all the physical throughputs are sorted in descending order is greater than or equal to a throughput threshold.

The physical throughput is an amount of data sent and received by a node in a unit time, and may be calculated by using a formula PhyThrought=(1−PER)*PhyRate. PER represents a packet error rate, PhyRate represents a physical rate, and PhyThrought represents the physical throughput. It should be noted herein that for related descriptions of the packet error rate and the physical rate, refer to related technical implementations. Details are not described herein.

The following describes an implementation in which a physical throughput corresponding to each antenna pattern may be obtained.

For each of dominant antenna patterns, when sending data packets to the second communication device in the antenna pattern, the first communication device may send the data packets to the second communication device in the antenna pattern based on different MCSs, then obtain BA frames with which the second communication device responds in the different MCSs, and determine, based on the BA frames, physical throughputs corresponding to the second communication device.

For example, the first communication device separately sends data packets to the terminal device based on three different MCSs. Assuming that the first communication device sends 50 PPDUs in each MCS, the second communication device returns BA frames to the first communication device in response to the 50 PPDUs. Correspondingly, if the first communication device receives a BA frame, the first communication device may obtain a packet error rate of communication between the first communication device and the second communication device in the MCS by collecting statistics about information carried in the received BA frame. Further, the first communication device may obtain a physical throughput of the second communication device in the MCS based on the packet error rate. For an implementation process in which the first communication device obtains the packet error rate of communication between the first communication device and the second communication device in the MCS by collecting statistics about the information carried in the received BA frame, refer to related technical descriptions. Details are not described herein.

After physical throughputs corresponding to all MCSs are obtained, the physical throughputs corresponding to all the MCSs may be added to represent a physical throughput corresponding to the antenna pattern.

It may be understood that, after physical throughputs corresponding to all antenna patterns are obtained, a larger physical throughput indicates a better antenna pattern corresponding to the physical throughput. In this embodiment, if a difference between the largest physical throughput and a physical throughput that ranks second when all the physical throughputs are sorted in descending order is greater than or equal to a throughput threshold, the antenna pattern is determined as the optimal antenna pattern. For example, the throughput threshold is one tenth of the physical throughput that ranks second.

According to the antenna pattern selection method provided in this embodiment of this disclosure, after dominant antenna patterns are determined, a physical throughput corresponding to each of the dominant antenna patterns is obtained to select an optimal antenna pattern. In the technical solution, when the optimal antenna pattern is selected by using a physical throughput, the physical throughput needs to be the largest, and a difference between the physical throughput and a physical throughput that ranks second when all physical throughputs are sorted in descending order further needs to be greater than or equal to a throughput threshold, so that accuracy of the optimal antenna pattern selected by using the physical throughput can be ensured.

In an optional embodiment, the method further includes: obtaining signal quality corresponding to each of the dominant antenna patterns; and the selecting the optimal antenna pattern from the dominant antenna patterns based on the physical throughput includes: selecting the optimal antenna pattern from the dominant antenna patterns based on the physical throughput and the signal quality. Signal quality corresponding to the optimal antenna pattern is highest signal quality in all signal quality corresponding to the dominant antenna patterns.

In this embodiment, after the dominant antenna pattern is determined, the optimal antenna pattern is determined based on the signal quality corresponding to each of the dominant antenna pattern in addition to the physical throughput corresponding to each dominant antenna pattern.

The following describes another implementation in which signal quality corresponding to each antenna pattern may be obtained.

For each of dominant antenna patterns, when sending data packets to the second communication device in the antenna pattern, the first communication device may send the data packets to the second communication device in the antenna pattern based on different MCSs, then obtain BA frames with which the second communication device responds to the data packets in the different MCSs, and determine, based on the BA frames, signal quality corresponding to the antenna pattern.

For example, signal quality is an RSSI. The first communication device separately sends data packets to the second communication device based on three different MCSs. Assuming that the first communication device sends 50 PPDUs in each MCS, for the second communication device, a maximum number of packets received by the second communication device is 150 when there is no packet loss, in other words, a maximum number of BA frames returned by the second communication device to the first communication device in the three MCSs is 150. Each BA frame has a corresponding RSSI. Therefore, the first communication device may obtain, by using RSSIs of the received BA frames, an RSSI corresponding to the antenna pattern.

In a possible implementation, the first communication device may obtain, by performing packet-by-packet filtering processing on the RSSIs of the received BA frames, the RSSI corresponding to the antenna pattern. For a specific implementation process thereof, refer to related technical descriptions. Details are not described herein.

It should be noted herein that obtaining, by using the RSSIs of the received BA frames, the final RSSI corresponding to the antenna pattern is not limited to the packet-by-packet filtering method. This is not limited in embodiments of this disclosure.

According to the antenna pattern selection method provided in this embodiment of this disclosure, after dominant antenna patterns are determined, to select an optimal antenna pattern from the dominant antenna patterns, not only a physical throughput corresponding to each antenna pattern is used as an evaluation metric, but also signal quality corresponding to each antenna pattern is used to jointly select the optimal antenna pattern. The method can improve accuracy of selecting the optimal antenna pattern. For example, transient movement of the second communication device may cause a relatively large throughput change. If only the physical throughput is used for evaluation, the optimal antenna pattern may change in this case. If two evaluation metrics are used for selection, the optimal antenna pattern is more reliable.

In an optional embodiment, after the optimal antenna pattern is determined, the method further includes: triggering antenna retraining if signal quality of communication with the second communication device constantly decreases for t consecutive periods and/or a physical throughput of communication with the second communication device constantly decreases for s consecutive periods, where t and s are positive integers greater than or equal to 2.

It may be understood that after the optimal antenna pattern is determined, the first communication device communicates with the second communication device based on the optimal antenna pattern. However, in an actual scenario, the second communication device frequently moves. When the second communication device moves outside a radiation area of the optimal antenna pattern, communication of the second communication device is poor if the optimal antenna pattern is still used to communicate with the second communication device. In this case, an antenna pattern needs to be re-selected, to ensure that communication of the second communication device is good.

In this embodiment, after the optimal antenna pattern is determined, if a physical throughput of the terminal device decreases for s consecutive periods or if measured signal quality and a measured physical throughput constantly decrease in the optimal antenna pattern when the first communication device communicates with the second communication device based on the antenna pattern, it indicates that the antenna pattern may be inapplicable to communication with the second communication device, and in this case, smart antenna training needs to be triggered again.

For example, statistics about an RSSI corresponding to the optimal antenna pattern may be collected every 100 packets in the optimal antenna pattern, and statistics about a physical throughput corresponding to the optimal antenna pattern may be collected every 300 packets in the optimal antenna pattern. The smart antenna retraining is triggered when the RSSI corresponding to the optimal antenna pattern constantly decreases for three times and the physical throughput decreases once or the physical throughput of the second communication device constantly decreases for three times.

In this embodiment, in comparison with the conventional technology, when it is determined whether to trigger smart antenna retraining, signal quality is introduced in addition to a physical throughput. Therefore, it may be determined, from a plurality of dimensions, whether to trigger smart antenna retraining, so that accuracy of triggering smart antenna retraining is improved.

Figure 3:
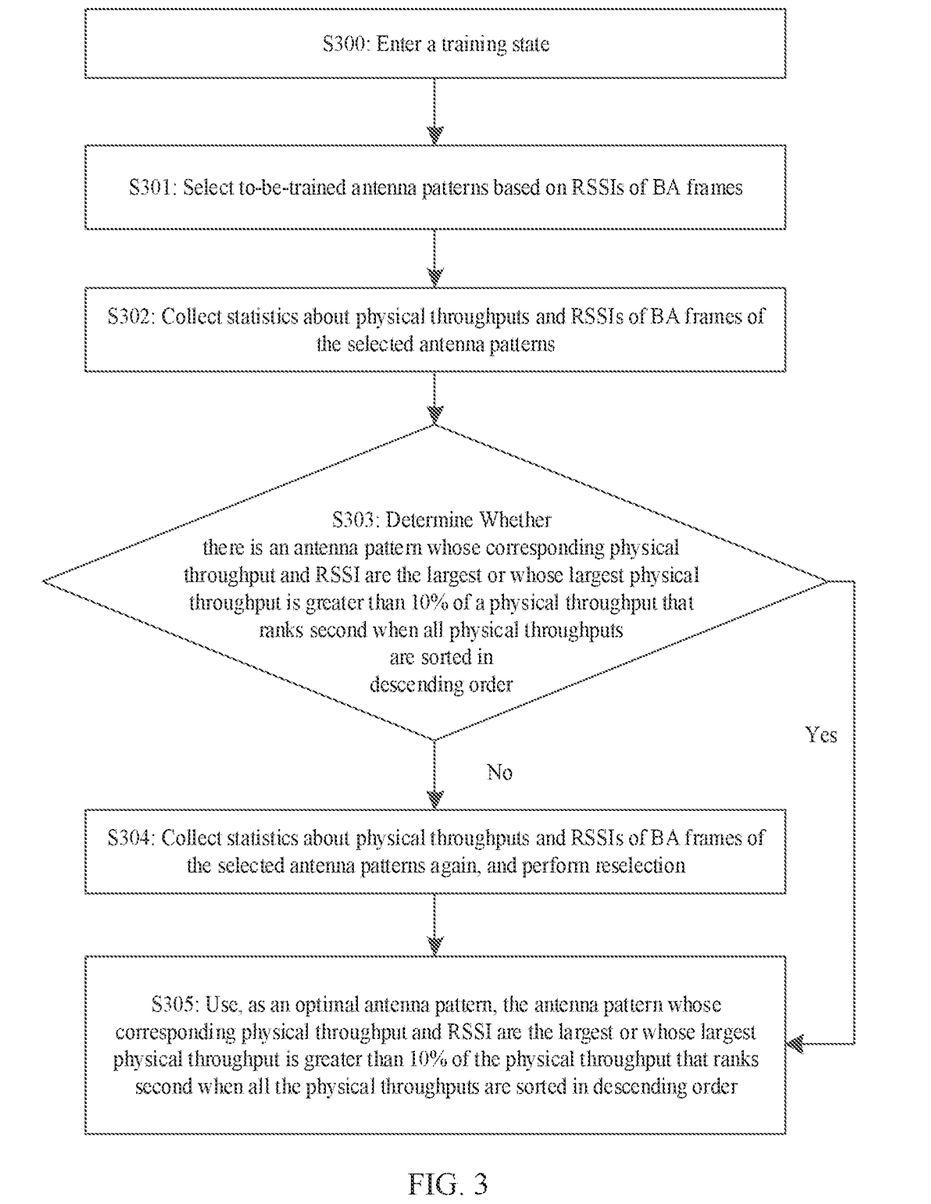
FIG. 3 is a schematic flowchart of an antenna pattern selection method according to another embodiment of this disclosure.

For ease of understanding, the following uses a case in which there is one omnidirectional antenna pattern and four directional antenna patterns and statistics about 100 BA frames corresponding to 100 PPDUs are collected for each antenna pattern to describe an antenna pattern selection method in another embodiment of this disclosure in detail with reference to FIG. 3. As shown in FIG. 3, the method in this embodiment may include S301, S302, S303, S304, and S305. The antenna pattern selection method may be performed by the first communication device in the communication system shown in FIG. 1.

S300: Enter a training state.

S301: Select to-be-trained antenna patterns based on RSSIs of BA frames.

In this embodiment, statistics about 100 BA frames are collected for each antenna pattern, and an average value of RSSIs of the 100 BA frames is used as signal quality of the antenna pattern. 100 BA frames of each antenna correspond to 100 PPDUs sent by using an omnidirectional antenna pattern.

For example, signal quality of each antenna pattern may be calculated by using the following formula:

$$avgRssi_{[i]} = \frac{\sum_{j=1}^{ppduNum[ant_i]} rssi[ant_i][j]}{ppduNum[ant_i]},$$

where i represents an antenna pattern, ppduNum[ant] represents a number of PPDUs whose statistics are collected when the antenna pattern is i, and $rssi[ant_i][j]$ represents an RSSI of a BA frame corresponding to the $j^{th}$ PPDU sent when the antenna pattern is i.

Then, after the received signal quality of each antenna pattern is obtained, an antenna pattern with highest signal quality is found, and all antenna patterns whose RSSI differences from an RSSI of the pattern fall within 0.5 decibel (dB) and the omnidirectional antenna pattern are combined for a next round of training.

S302: Collect statistics about physical throughputs and RSSIs of BA frames of the selected antenna patterns.

For example, for each of the selected antenna patterns, training may be performed for three different MCSs. In each MCS, 50 PPDUs are used for an attempt, and physical throughputs of the antenna pattern in all the MCSs are calculated. Then the physical throughputs corresponding to the antenna pattern in all the MCSs are added as a total physical throughput of the antenna pattern. Similarly, packet-by-packet processing is performed on RSSIs of all BA frames corresponding to the antenna pattern in all the MCSs, to obtain a final RSSI. For a detailed implementation process thereof, refer to the foregoing related descriptions in embodiments. Details are not described herein again.

S303: Determine whether there is an antenna pattern whose corresponding physical throughput and RSSI are the largest or whose largest physical throughput is greater than 10% of a physical throughput that ranks second when all physical throughputs are sorted in descending order; and if no, perform S304; or if yes, perform S305.

S304: Collect statistics about physical throughputs and RSSIs of BA frames of the selected antenna patterns again, and perform reselection.

S305: Use, as an optimal antenna pattern, the antenna pattern whose corresponding physical throughput and RSSI are the largest or whose largest physical throughput is greater than 10% of the physical throughput that ranks second when all the physical throughputs are sorted in descending order.

In this embodiment, there are two bases for determining the optimal antenna pattern: both a physical throughput and an RSSI are the largest, and a largest physical throughput is greater than 10% of a physical throughput that ranks second when all physical throughputs are sorted in descending order. For a detailed implementation process of S303 to S305, refer to the foregoing descriptions in embodiments. Details are not described herein again.

According to the antenna pattern selection method provided in this embodiment, when dominant antenna patterns are obtained, the omnidirectional antenna pattern may be used to send data packets at a relatively high sending rate, so that a reverse antenna pattern can be eliminated at minimum costs, thereby ensuring that in a smart antenna training process, only the dominant antenna patterns are trained during training in which an order is increased.

Optionally, after S305, in a process of communication using the optimal antenna pattern, it may be determined, by measuring a physical throughput and an RSSI of a BA frame that correspond to the optimal antenna pattern, whether to trigger retraining.

For example, statistics about an RSSI of a BA frame may be collected once every 100 PPDUs, and a physical throughput may be calculated once every 300 PPDUs. The RSSI whose statistics are collected is compared with previously recorded data. Retraining is triggered if the RSSI of the BA frame constantly decreases for three times and the physical throughput decreases once or the physical throughput constantly decreases for three times. For a detailed implementation process of this step, refer to the foregoing descriptions in embodiments. Details are not described herein again.

Figure 4:
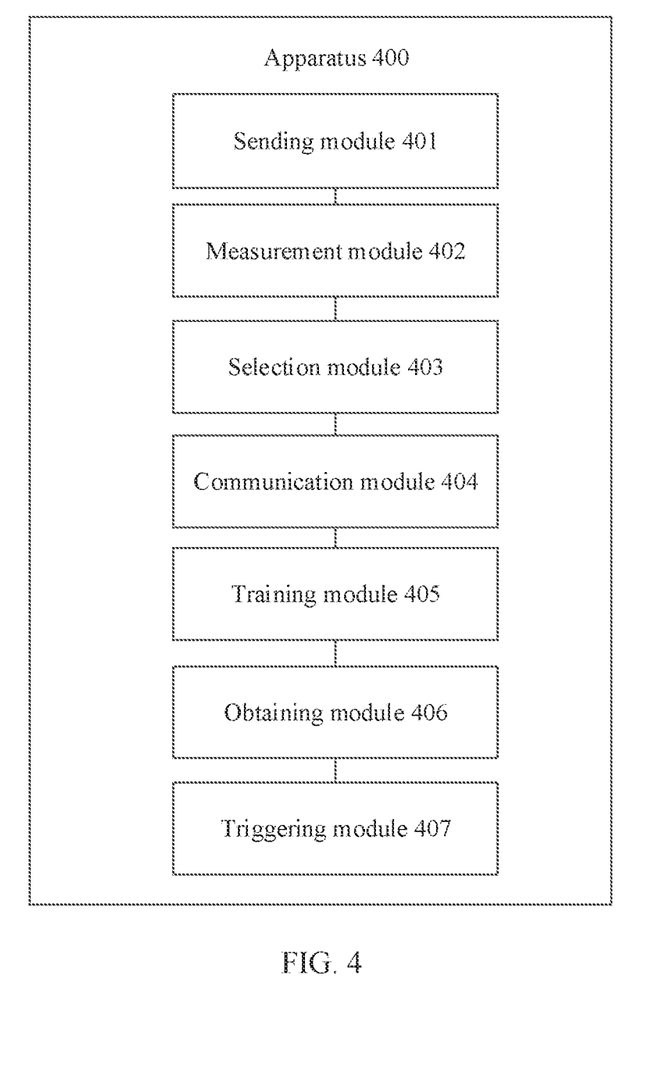
FIG. 4 is a schematic diagram of a structure of an antenna pattern selection apparatus according to an embodiment of this disclosure.

FIG. 4 is a schematic diagram of a structure of an antenna pattern selection apparatus according to an embodiment of this disclosure. The selection apparatus shown in FIG. 4 may be configured to perform the antenna pattern selection method in any one of the foregoing embodiments.

As shown in FIG. 4, the antenna pattern selection apparatus 400 in this embodiment includes a sending module 401, a measurement module 402, and a selection module 403.

The sending module 401 is configured to send a plurality of packets to a second communication device. The measurement module 402 is configured to measure, in each of a plurality of antenna patterns, signal quality of a plurality of acknowledgment frames with which the second communication device separately responds to the plurality of packets. The selection module 403 is configured to select a dominant antenna pattern from the plurality of antenna patterns based on signal quality corresponding to each of the plurality of antenna patterns.

For example, the sending module 401 may be configured to perform the step of sending the plurality of packets to the second communication device in the antenna pattern selection method shown in FIG. 2. For example, the sending module 401 is configured to perform S201.

For another example, the selection module 403 may be configured to perform the step of selecting the dominant antenna pattern in the antenna pattern selection method shown in FIG. 2. For example, the selection module 403 is configured to perform S203.

In a possible implementation, the sending module 401 is configured to send the plurality of packets to the second communication device in an omnidirectional antenna pattern.

In a possible implementation, the plurality of packets includes a plurality of data frames.

In a possible implementation, when there is one dominant antenna pattern, the apparatus 400 further includes a communication module 404, configured to communicate with the second communication device by using the dominant antenna pattern as an optimal antenna pattern.

In a possible implementation, when a number of dominant antenna patterns is greater than 1, the apparatus 400 further includes a training module 405, configured to perform antenna training on the dominant antenna patterns to obtain an optimal antenna pattern. The communication module 404 is further configured to communicate with the second communication device by using the optimal antenna pattern.

In a possible implementation, the training module 405 is configured to: obtain a physical throughput corresponding to each of the dominant antenna patterns; and select the optimal antenna pattern from the dominant antenna patterns based on the physical throughput. A first physical throughput corresponding to the optimal antenna pattern is a largest physical throughput in all physical throughputs corresponding to the dominant antenna patterns, and a difference between the first physical throughput and a physical throughput that ranks second when all the physical throughputs are sorted in descending order is greater than or equal to a throughput threshold.

In a possible implementation, the throughput threshold is one tenth of the physical throughput that ranks second.

In a possible implementation, the apparatus 400 further includes an obtaining module 406, configured to obtain signal quality corresponding to each of the dominant antenna patterns. The selection module 403 is further configured to select the optimal antenna pattern from the dominant antenna patterns based on the physical throughput and the signal quality. Signal quality corresponding to the optimal antenna pattern is highest signal quality in all signal quality corresponding to the dominant antenna patterns.

In a possible implementation, the apparatus 400 further includes a triggering module 407, configured to trigger smart antenna retraining if signal quality of communication with the second communication device constantly decreases for t consecutive periods and/or a physical throughput of communication with the second communication device constantly decreases for s consecutive periods when the apparatus 400 communicates with the second communication device in the optimal antenna pattern, where t and s are positive integers greater than or equal to 2.

Figure 5:
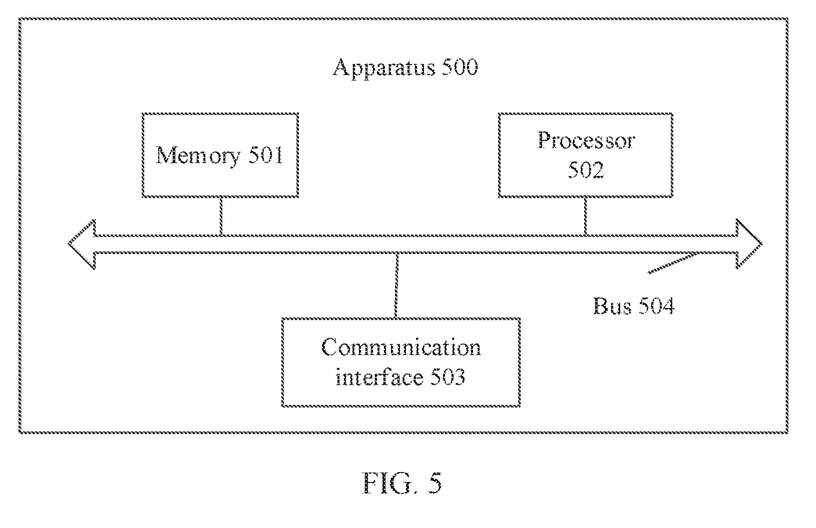
FIG. 5 is a schematic diagram of a structure of an antenna pattern selection apparatus according to another embodiment of this disclosure.

FIG. 5 is a schematic diagram of a structure of an antenna pattern selection apparatus according to another embodiment of this disclosure. The apparatus shown in FIG. 5 may be configured to perform the antenna pattern selection method in any one of the foregoing embodiments.

As shown in FIG. 5, the apparatus 500 in this embodiment includes a memory 501, a processor 502, a communication interface 503, and a bus 504. The memory 501, the processor 502, and the communication interface 503 are communicatively connected to each other through the bus 504.

The memory 501 may be a read-only memory (ROM), a static storage device, a dynamic storage device, or a random-access memory (RAM). The memory 501 may store a program. When the program stored in the memory 501 is executed by the processor 502, the processor 502 is configured to perform steps of the method shown in FIG. 2 or FIG. 3.

The processor 502 may be a general-purpose central processing unit (CPU), a microprocessor, an application-specific integrated circuit (ASIC), or one or more integrated circuits, configured to execute a related program, to implement the method shown in FIG. 2 or FIG. 3 of this disclosure.

Alternatively, the processor 502 may be an integrated circuit chip and has a signal processing capability. In an implementation process, steps of the method in FIG. 2 or FIG. 3 of this disclosure may be completed by using an integrated logic circuit of hardware in the processor 502 or instructions in a form of software.

Alternatively, the processor 502 may be a general-purpose processor, a digital signal processor (DSP), an ASIC, a field-programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor, or the like.

Steps of the methods disclosed with reference to embodiments of this disclosure may be directly executed and accomplished by a hardware decoding processor, or may be executed and accomplished by using a combination of hardware and software modules in a decoding processor. The software module may be located in a mature storage medium in the art, for example, a RAM, a flash memory, a read-only memory, a programmable read-only memory, an electrically erasable programmable memory, or a register. The storage medium is located in the memory 501. The processor 502 reads information in the memory 501 and completes, by using hardware of the processor 502, functions that need to be performed by units included in the antenna pattern selection apparatus in this disclosure. For example, the processor 502 may perform steps/functions in the embodiment shown in FIG. 2 or FIG. 3.

The communication interface 503 may use a transceiver apparatus, for example, but not limited to, a transceiver, to implement communication between the apparatus 500 and another device or a communication network.

The bus 504 may include a channel for transmitting information between components (for example, the memory 501, the processor 502, and the communication interface 503) of the apparatus 500.

It should be understood that the apparatus 500 in this embodiment of this disclosure may be an electronic device or may be a chip configured in an electronic device.

It should be understood that the processor in embodiments of this disclosure may be a central processing unit (CPU). The processor may also be another general-purpose processor, a DSP, an ASIC, a FPGA or another programmable logic device, a discrete gate or a transistor logic device, a discrete hardware component, or the like. The general-purpose processor may be a microprocessor, or the processor may be any conventional processor, or the like.

It should further be understood that the memory in embodiments of this disclosure may be a volatile memory or a non-volatile memory, or may include a volatile memory and a non-volatile memory. The non-volatile memory may be a ROM, a programmable read-only memory (PROM), an erasable programmable read-only memory (EPROM), an electrically erasable programmable read-only memory (EEPROM), or a flash memory. The volatile memory may be a RAM, used as an external cache. Through an example rather than a limitative description, RAMs in many forms may be used, for example, a static RAM (SRAM), a dynamic random-access memory (DRAM), a synchronous DRAM (SDRAM), a double data rate SDRAM (DDR SDRAM), an enhanced SDRAM (ESDRAM), a synchlink DRAM (SLDRAM), and a direct rambus RAM (DR RAM).

All or some of the foregoing embodiments may be implemented by software, hardware, firmware, or any combination thereof. When software is used to implement the embodiments, all or some of the embodiments may be implemented in a form of a computer program product. The computer program product includes one or more computer instructions or computer programs. When the computer instructions or the computer programs are loaded or executed on a computer, the procedure or functions according to embodiments of this disclosure are all or partially generated. The computer may be a general-purpose computer, a dedicated computer, a computer network, or another programmable apparatus. The computer instructions may be stored in a computer-readable storage medium or may be transmitted from one computer-readable storage medium to another computer-readable storage medium. For example, the computer instructions may be transmitted from a web site, computer, server, or data center to another website, computer, server, or data center in a wired (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital versatile disc (DVD)), or a semiconductor medium. The semiconductor medium may be a solid-state drive.

It should be understood that the term "and/or" in this specification describes only an association between associated objects and represents that three relationships may exist. For example, A and/or B may represent the following three cases: only A exists, both A and B exist, and only B exists. A and B may be singular or plural. In addition, the character "/" in this specification usually represents an "or" relationship between associated objects, or may represent an "and/or" relationship. A specific meaning depends on a context.

In this disclosure, "at least one" means one or more, and "a plurality of" means two or more. "At least one of the following items (pieces)" or a similar expression thereof refers to any combination of these items, including any combination of singular items (pieces) or plural items (pieces). For example, at least one (piece) of a, b, or c may represent: a, b, c, a and b, a and c, b and c, or a, b and c, where a, b, and c may be singular or plural.

It should be understood that sequence numbers of the foregoing processes do not mean execution sequences in embodiments of this disclosure. The execution sequences of the processes should be determined based on functions and internal logic of the processes, and should not constitute any limitation on implementation processes of embodiments of this disclosure.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

A person skilled in the art may clearly understand that, for convenient and brief description, for detailed working processes of the foregoing systems, apparatuses, and units, refer to corresponding processes in the foregoing method embodiments. Details are not described herein again.

In the several embodiments provided in this disclosure, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or the units may be implemented in electronic, mechanical, or other similar forms.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this disclosure essentially, or a part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this disclosure. The foregoing storage medium includes any medium that can store program code, for example, a Universal Serial Bus (USB) flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. An antenna pattern selection method implemented by a first communication device, wherein the antenna pattern selection method comprises:
sending, through an omnidirectional antenna pattern and a plurality of directional antenna patterns, packets to a second communication device, wherein the omnidirectional antenna pattern covers a 0 to 360 degree beam energy concentration, and wherein each of the plurality of directional antenna patterns corresponds to a specific direction and covers less than the 0 to 360 degree beam energy concentration;

receiving, from the second communication device and in response to sending the packets, acknowledgment frames corresponding to the omnidirectional antenna pattern and the plurality of directional antenna patterns and indicating that the second communication device received the packets;

measuring signal qualities of the acknowledgment frames; and selecting, based on the signal qualities corresponding to the omnidirectional antenna pattern and the plurality of directional antenna patterns, a dominant antenna pattern from the omnidirectional antenna pattern and the plurality of directional antenna patterns.

2. The antenna pattern selection method of claim 1, wherein the packets comprise data frames.

3. The antenna pattern selection method of claim 1, wherein when the dominant antenna pattern is one dominant antenna pattern, the antenna pattern selection method further comprises communicating with the second communication device by using the one dominant antenna pattern as an optimal antenna pattern.

4. The antenna pattern selection method of claim 1, wherein when the dominant antenna pattern is a plurality of dominant antenna patterns, the antenna pattern selection method further comprises:

performing antenna training on the dominant antenna patterns to obtain an optimal antenna pattern; and communicating with the second communication device by using the optimal antenna pattern.

5. The antenna pattern selection method of claim 4, wherein performing the antenna training comprises:

obtaining a physical throughput corresponding to each of the dominant antenna patterns; and selecting, based on the physical throughput corresponding to each of the dominant antenna patterns, the optimal antenna pattern, wherein a first physical throughput corresponding to the optimal antenna pattern is a largest physical throughput in all physical throughputs corresponding to the dominant antenna patterns, and wherein a difference between the first physical throughput and a second physical throughput that ranks second when all the physical throughputs are sorted in descending order is greater than or equal to a throughput threshold.

6. The antenna pattern selection method of claim 5, wherein the throughput threshold is one tenth of the second physical throughput.

7. The antenna pattern selection method of claim 5, further comprising obtaining a signal quality corresponding to each of the dominant antenna patterns, wherein selecting the optimal antenna pattern comprises selecting, based on the signal quality corresponding to each of the dominant antenna patterns, the optimal antenna pattern, and wherein the signal quality corresponding to the optimal antenna pattern is a highest signal quality in the dominant antenna patterns.

8. The antenna pattern selection method of claim 3, further comprising triggering antenna retraining when a signal quality of communication with the second communication device constantly decreases for t consecutive periods and when a physical throughput of communication with the second communication device constantly decreases for s consecutive periods when the first communication device communicates with the second communication device in the optimal antenna pattern, wherein t and s are positive integers greater than or equal to 2.

9. An antenna pattern selection apparatus, comprising:

a memory configured to store instructions; and a processor coupled to the memory and configured to execute the instructions to cause the antenna pattern selection apparatus to:

send, through an omnidirectional antenna pattern and a plurality of directional antenna patterns, packets to a second communication device, wherein the omnidirectional antenna pattern covers a 0 to 360 degree beam energy concentration, and wherein each of the plurality of directional antenna patterns corresponds to a specific direction and covers less than the 0 to 360 degree beam energy concentration;

receive, from the second communication device and in response to sending the packets, acknowledgment frames corresponding to the omnidirectional antenna pattern and the plurality of directional antenna patterns and indicating that the second communication device received the packets;

measure signal qualities of the acknowledgment frames; and select, based on the signal qualities corresponding to the omnidirectional antenna pattern and the plurality of directional antenna patterns, a dominant antenna pattern from the omnidirectional antenna pattern and the plurality of directional antenna patterns.

10. A computer program product comprising instructions stored on a non-transitory computer readable medium that, when executed by a processor, cause a first communication device to:

send, through an omnidirectional antenna pattern and a plurality of directional antenna patterns, packets to a second communication device, wherein the omnidirectional antenna pattern covers a 0 to 360 degree beam energy concentration, and wherein each of the plurality of directional antenna patterns corresponds to a specific direction and covers less than the 0 to 360 degree beam energy concentration;

receive, from the second communication device and in response to sending the packets, acknowledgment frames corresponding to the omnidirectional antenna pattern and the plurality of directional antenna patterns and indicating that the second communication device received the packets;

measure signal qualities of the acknowledgment frames; and select, based on the signal qualities corresponding to the omnidirectional antenna pattern and the plurality of directional antenna patterns, a dominant antenna pattern from the omnidirectional antenna pattern and the plurality of directional antenna patterns.

11. The computer program product of claim 10, wherein the packets comprise data frames.

12. The computer program product of claim 10, wherein when the dominant antenna pattern is one dominant antenna pattern, the instructions further cause the first communication device to communicate with the second communication device by using the one dominant antenna pattern as an optimal antenna pattern.

13. The computer program product of claim 10, wherein when the dominant antenna pattern is a plurality of dominant antenna patterns, the instructions further cause the first communication device to:

perform antenna training on the dominant antenna patterns to obtain an optimal antenna pattern; and communicate with the second communication device by using the optimal antenna pattern.

14. The computer program product of claim 13, wherein performing the antenna training comprises:

obtaining a physical throughput corresponding to each of the dominant antenna patterns; and selecting, based on the physical throughput corresponding to each of the dominant antenna patterns, the optimal antenna pattern, wherein a first physical throughput corresponding to the optimal antenna pattern is a largest physical throughput in all physical throughputs corresponding to the dominant antenna patterns, and wherein a difference between the first physical throughput and a second physical throughput that ranks second when all the physical throughputs are sorted in descending order is greater than or equal to a throughput threshold.

15. The computer program product of claim 14, wherein the throughput threshold is one tenth of the second physical throughput.

16. The computer program product of claim 14, wherein the instructions further cause the first communication device to obtain a signal quality corresponding to each of the dominant antenna patterns, wherein selecting the optimal antenna pattern further comprises selecting, based on the signal quality corresponding to each of the dominant antenna patterns, the optimal antenna pattern, and wherein the signal quality corresponding to the optimal antenna pattern is a highest signal quality in the dominant antenna patterns.

17. The antenna pattern selection method of claim 3, further comprising triggering antenna retraining when a signal quality of communication with the second communication device constantly decreases for t consecutive periods, wherein t is a positive integer greater than or equal to 2.

18. The antenna pattern selection method of claim 3, further comprising triggering antenna retraining when a physical throughput of communication with the second communication device constantly decreases for s consecutive periods when the first communication device communicates with the second communication device in the optimal antenna pattern, and wherein s is an integer greater than or equal to 2.

19. The antenna pattern selection method of claim 1, wherein measuring the signal qualities comprises measuring received signal strength indicator (RSSI) or signal-to-noise ratio (SNR) of the acknowledgment frames corresponding to the omnidirectional antenna pattern and the plurality of directional antenna patterns.

20. The antenna pattern selection method of claim 1, wherein the plurality of directional antenna patterns comprises a 0 to 90 degree antenna pattern, a 90 to 180 degree antenna pattern, a 180 to 270 degree antenna pattern, and a 270 to 360 degree antenna pattern.

* * * * *